United States Patent
Souma

(10) Patent No.: US 8,106,948 B2
(45) Date of Patent: Jan. 31, 2012

(54) MOBILE TERMINAL DEVICE, COMPUTER-READABLE RECORDING MEDIUM, AND COMPUTER DATA SIGNAL

(75) Inventor: Atsuo Souma, Hitachinaka (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 1629 days.

(21) Appl. No.: 11/454,325

(22) Filed: Jun. 16, 2006

(65) Prior Publication Data

US 2006/0285677 A1 Dec. 21, 2006

(30) Foreign Application Priority Data

Jun. 16, 2005 (JP) ................ 2005-176076

(51) Int. Cl.
*H04N 7/18* (2006.01)
(52) U.S. Cl. ................ 348/158; 348/143
(58) Field of Classification Search ........... 348/142–160
See application file for complete search history.

(56) References Cited

U.S. PATENT DOCUMENTS 6,845,408 B1 1/2005 Lemke et al.

FOREIGN PATENT DOCUMENTS

| JP | 10-145884 | * | 5/1998 |
| JP | 11-113063 | | 4/1999 |
| JP | 11-168534 | | 6/1999 |
| JP | 2000-182310 | | 6/2000 |
| JP | 2001-245026 | | 9/2001 |
| JP | 2003-023479 | | 1/2003 |
| JP | 2003-111004 | | 4/2003 |
| JP | 2004-193944 | | 7/2004 |

OTHER PUBLICATIONS

Office Action dated Apr. 23, 2007 issued for the corresponding Korean Patent Application No. 10-2006-0054270.
Office Action dated Feb. 19, 2008 issued for the corresponding Japanese Patent Application No. 2005-176076.

* cited by examiner

*Primary Examiner* — Andy Rao
(74) *Attorney, Agent, or Firm* — Cozen O'Connor

(57) ABSTRACT

Even if an external output device like an earphone is disconnected during outputting of reproduced recorded contents, the recorded contents can be consecutively output at the time of subsequent reproduction. When an earphone connection detector detects that an earphone is disconnected during the reproduction operation of reproducing and outputting audio and image information in a recording section with the earphone being connected, a CPU performs control in such a manner as to stop the reproduction operation. When the earphone connection detector detects that the earphone is connected while the reproduction operation is stopped, the CPU resumes reproducing the audio and image information in the recording section at the stop position.

13 Claims, 5 Drawing Sheets

MOBILE TERMINAL DEVICE, COMPUTER-READABLE RECORDING MEDIUM, AND COMPUTER DATA SIGNAL

BACKGROUND OF THE INVENTION

1. Field of the Invention

The present invention relates to a mobile terminal device having a removable external output device, a computer-readable recording medium, and a computer data signal.

2. Description of the Related Art

Generally, when the plug of a head phone as an external output device is plugged out from a jack section of a speaker embedded type audio device while a user is listening to music, a news program, or the like with the head phone being connected thereto, a large volume sound is suddenly generated from an embedded speaker.

As disclosed in, for example, Unexamined Japanese Patent Application KOKAI Publication No. H10-145884, there is known a technology which suppresses the volume of the embedded speaker at an appropriate level when the head phone is plugged out from the audio device and audio output is switched over to the embedded speaker, and enables adjustment of the volume to a desired level by a later operation of the user.

The foregoing technology switches over the audio output to the embedded speaker so that the user can consecutively listen to music to which the user has been listening so far even if the head phone is plugged out. Accordingly, even if the volume when the head phone is plugged off is adjusted to an appropriate level, it bothers people nearby in a public place like in a train. To overcome this problem, the volume level should be automatically adjusted to "0 (mute)" at the time of switching over from the head phone to the embedded speaker.

In this case, however, because it becomes a mute state until the head phone is reconnected, in a case where the user is listening to a broadcast program in real time, for example, the user fails to hear the broadcast contents during a time from plugging off of the head phone to reconnection thereof.

In a case where the head phone is plugged off during the user is listening to recorded contents, so that the mode becomes a mute state, the user needs to do a reverse operation to adjust a reproduction start position in order to listen to recorded contents the user has missed. It is, however, very difficult to accurately reverse the recorded contents to the position of the missed part, and if it is not accurately reversed, the user may fail to hear some of the contents the user has missed again.

SUMMARY OF THE INVENTION

The present invention has been made in view of the aforementioned circumstances, and it is an object of the invention to provide a mobile terminal device, a computer-readable recording medium, and a computer data signal which can prevent a user from failing to hear sound information without switching a sound output from an external output to an internal output when an external output device is removed from the mobile terminal device.

To achieve the object, a mobile terminal device according to the first aspect of the invention is a mobile terminal device which reproduces recorded contents and outputs the recorded contents to a removable external output device when the external output device is connected thereto, comprises:

a detector which detects whether the external output device is connected or not; and a reproduction controller which performs control in such a manner as to stop a reproduction operation of the recorded contents when the detector detects that the external output device is disconnected during the reproduction operation of reproducing and outputting the recorded contents with the external output device being connected to the mobile terminal device.

The mobile terminal device may further comprise a connection section which is connectable with at least any one of an earphone, a head phone, and an external speaker as the removable external output device, wherein the detector detects whether the external output device is connected to the connection section or not.

The mobile terminal device may further comprise an alert display section which displays alert such that the external output device is disconnected, when it is detected that the external output device is disconnected during the reproduction operation with the external output device being connected.

In the mobile terminal device, when it is detected that the external output device is disconnected during the reproduction operation of reproducing and outputting sound information with image information, the reproduction controller may perform control in such a manner as to stop the reproduction operation of the sound information and a reproduction operation of the image information.

In the mobile terminal device, the control of stopping the reproduction operation may be a pause control, and the reproduction controller may fixedly display image information at a time of pausing while pausing the reproduction of the image information.

In the mobile terminal device, the control of stopping the reproduction operation may be a pause control, and the reproduction controller may continue the reproduction operation when the detector detects that the external output device is reconnected with the reproduction operation being paused.

The mobile terminal device may further comprise an internal output section, wherein when a reproduction instruction operation is executed with the reproduction operation of outputting recorded contents from the external output device being stopped, the reproduction controller continues the reproduction operation of outputting recorded contents from the internal output section.

A mobile terminal device according to the second aspect of the invention is a mobile terminal device which externally receives sound information, and outputs the sound information to a removable external output device, comprises:

a detector which detects whether the external output device is connected or not; and an output controller which performs control in such a manner as to suppress outputting of the sound information when the detector detects that the external output device is disconnected during the outputting of the sound information with the external outputting device being connected to the mobile terminal device, and consecutively records sound information received thereafter.

In the mobile terminal device, when the detector detects that the external output device is reconnected during sequential recording of sound information, the output controller may reproduce recorded contents of sound information and outputs the recorded contents to the external output device.

In the mobile terminal device, when the detector detects that the external output device is reconnected during sequential recording of sound information, the output controller may accept a selection operation of arbitrarily selecting reproducing and outputting recorded contents of sound information to the external output device, or outputting sound information received after the reconnection of the external output device, and execute outputting in accordance with the selection operation.

In the mobile terminal device, the sound information may be sound information with image information, and is synchronized with the image information, and the output controller may consecutively record the image information together with the sound information.

A computer-readable recording medium according to the third aspect of the invention stores a program which allows a computer to realize main functions of the mobile terminal device of the first aspect of the invention.

A computer-readable recording medium according to the fourth aspect of the invention stores a program which allows a computer to realize main functions of the mobile terminal device of the second aspect of the invention.

A computer data signal according to the fifth aspect of the invention embodied in a carrier wave represents a program which allows a computer to realize main functions of the mobile terminal device of the first aspect of the invention.

A computer data signal according to the sixth aspect of the invention embodied in a carrier wave represents a program which allows a computer to realize main functions of the mobile terminal device of the second aspect of the invention.

A mobile terminal device according to the seventh aspect of the invention is a mobile terminal device which outputs a sound based on sound data from a removably connected external output device comprises:

a sound output section which outputs the sound data to the external output device;

a connection determination section which determines whether the external output device is connected or not;

a sound output stop section which stops outputting of the sound data by the sound output section when the connection determination section determines that the external output device is not connected while the sound output section is outputting the sound data; and a sound output resuming section which resumes outputting of the sound data by the sound output section at that position where the sound output stop section has stopped outputting of the sound data, when the connection determination section determines that the external output device is connected while the sound output stop section is stopping outputting of the sound data.

The mobile terminal device may further comprise a memory section which stores the sound data, wherein the sound output section may output the sound data read out from the memory section to the external output device, the sound output stop section may stop reading out of the sound data from the memory section when outputting of the sound data is to be stopped, and have a stop position recording section which records stop position of reading out, and the sound output resuming section may read out the sound data from the stop position recorded by the stop position recording section, and resume outputting of the sound data.

The mobile terminal device may further comprise a receiver which receives the sound data, wherein the sound output section may output the sound data received by the receiver to the external output device, the sound output stop section may have a received data recording section which starts recording the sound data received by the receiver when outputting of the sound data is stopped, and the sound output resuming section may output the sound data recorded by the received data recording section, and resume outputting of the sound data.

A computer-readable recording medium according to the eighth aspect of the invention stores a program which allows a computer to realize main functions of the mobile terminal device of the seventh aspect of the invention.

A computer data signal according to the ninth aspect of the invention embodied in a carrier wave represents a program which allows a computer to realize main functions of the mobile terminal device of the seventh aspect of the invention.

The invention can prevent a user from missing sound information when the external output device is disconnected from the mobile terminal device without switching over a sound output from an external output to an internal output.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

First Embodiment

The first embodiment of the invention will be explained with reference to FIGS. 1 through 3.

This embodiment exemplifies a case where the invention is applied to a cellular phone device as a mobile terminal device.

Figure 1:
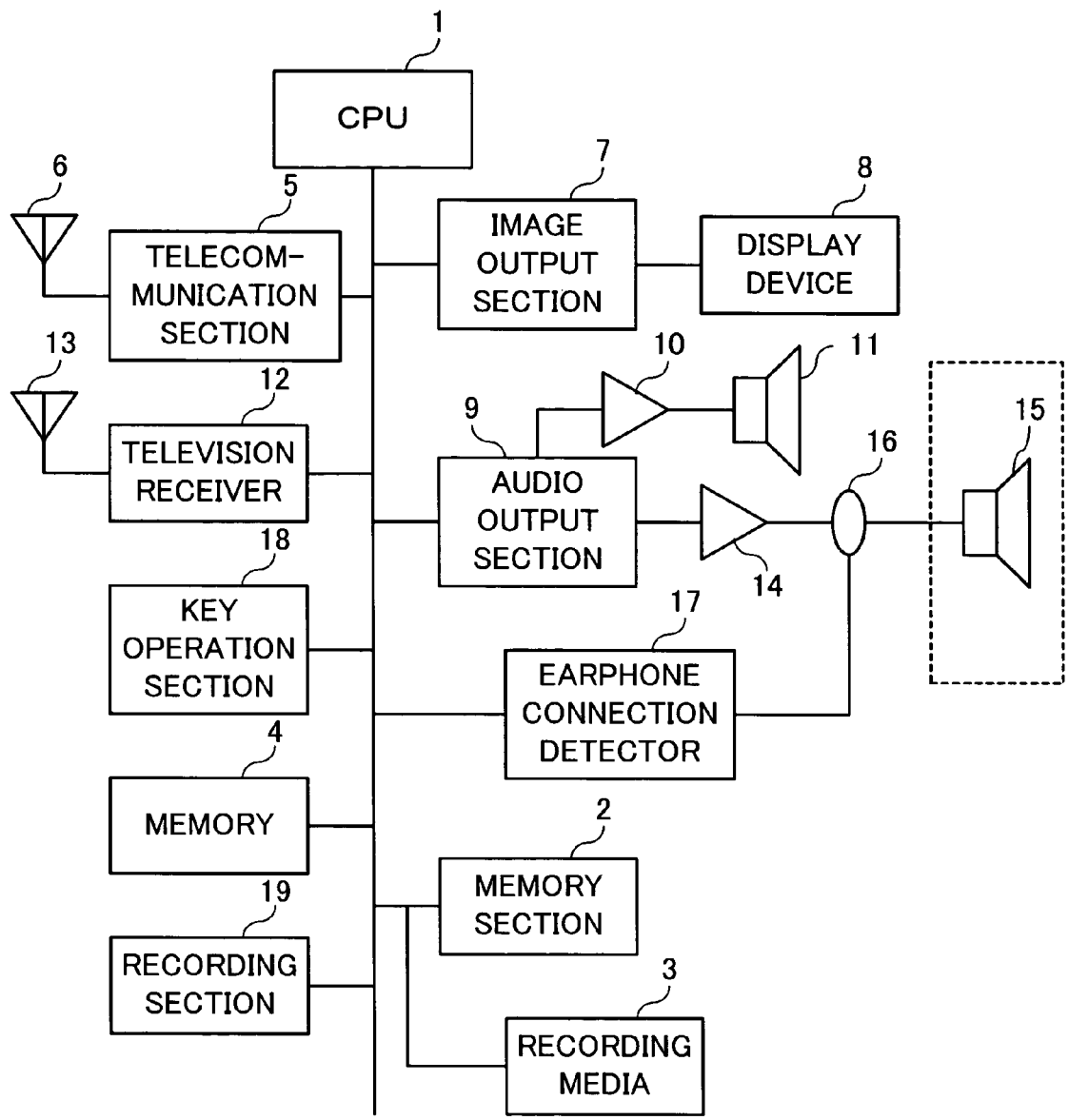
FIG. 1 is a block diagram illustrating the basic structure of a cellular phone device with a television function applied as a mobile terminal device.

FIG. 1 is a block diagram illustrating the basic structure of the cellular phone device.

A CPU 1 is a central processing unit which controls general operation of the cellular phone device in accordance with various programs in a memory section 2.

The memory section 2 is a non-volatile memory (internal memory), and comprises, for example, a flash memory. The memory section 2 has a program area and a data area, and a program for realizing later-described operation procedures illustrated in FIGS. 2 and 3 is stored in the program area.

A recording media 3 is a removable and transportable type memory, and comprises, for example, a memory card or an IC card. The recording media 3 is used for externally supplying various data, such as shot image data and program, and accepting external supplying of such data.

A memory 4 is an internal memory having a work area, and comprises, for example, a DRAM (Direct Random Access memory) or an SDRAM (Synchronous DRAM).

A telecommunication section 5 acquires a signal from the receiver side of a transmission and reception duplexer connected to an antenna 6, demodulates the acquired signal into a reception baseband signal, and outputs it as audio data (acoustic data) or image data (visual data). The image data is displayed on a display device 8 like an LCD (Liquid Crystal Display) through an image output section 7. The audio data is audio output from an embedded speaker 11 through an audio output section 9 and a speaker amplifier 10.

The telecommunication section 5 encodes audio data input from a microphone (not illustrated) into a transmission baseband signal, modulates and gives it to the transmission side of the transmission and reception duplexer. The modulated signal is transmitted and output from the antenna 6.

A television receiver 12 is connected to a TV antenna 13, and receives, for example, terrestrial digital broadcastings for portable receivers such as cellular phones. The television receiver 12 can also receive an EPG (Electronic Program Guide) or the like in addition to television images and a television audio. The television receiver 12 comprises an exclusive CPU, a receiver connected to the TV antenna 13, amplification divider which divides a received telecast into an image signal and an audio signal, a decoder which decompresses compressed data, and the like.

A television image signal output from the television receiver 12 is displayed by the display device 8 through the image output section 7. A television audio signal output from the television receiver 12 is output from an embedded speaker 11 through the audio output section 9 and the speaker amplifier 10.

The audio output section 9 performs digital/analog conversion on digital audio information, and operates an electrical volume according to the manipulation of the user to adjust a volume level. The audio output section 9 is connected to the embedded speaker 11 through the speaker amplifier 10, and is connected to an earphone 15 through an earphone amplifier 14 and a jack section 16.

When the earphone 15 is plugged in the jack section 16, the CPU 1 outputs audio information through the earphone 15, instead of the embedded speaker 11. That is, when the earphone 15 is not connected, the CPU 1 outputs audio information through the embedded speaker 11, and when the earphone 15 is connected, the CPU 1 outputs audio information through the earphone 15. Audio information (audio data) is a broad sound information (sound data) including music or the like in addition to a speech. Hereinafter, the same goes for this term.

An earphone connection detector 17 comprises a pull-up resistor, a switching element, and the like, and detects whether the earphone 15 is connected to the jack section 16 or not. In other words, the earphone connection detector 17 detects a connection status whether or not the plug of the earphone 15 is plugged off from the jack section 16.

The CPU 1 always monitors a detection signal from the earphone connection detector 17, determines connection/disconnection of the earphone 15 based on the detection signal, and turns ON/OFF the speaker amplifier 10 and the earphone amplifier 14. For example, with the earphone 15 being not connected, the detection signal from the earphone connection detector 17 is at a high level, and the CPU 1 turns ON the speaker amplifier 10 and turns OFF the earphone amplifier 14 through the audio output section 9. With the earphone 15 being connected, the detection signal from the earphone connection detector 17 is at a low level, the CPU 1 turns ON the earphone amplifier 14 and turns OFF the speaker amplifier 10 through the audio output section 9.

A key operation section 18 has various push button type keys, and is for the user who carries out dial input, character input, command input, and the like. The key operation section 18 has, for example, a mode key which switches a operation mode (mail mode, television reception mode, and the like), a television termination key which terminates television reception, a record key which instructs recording of a television broadcasting (including audio recording and image recording), a pause key which instructs pause of the reproduction of recorded contents, a cancel key which instructs cancel of the reproduction of the recorded contents, and an audio volume adjustment key. The CPU 1 executes a process in accordance with a key input signal from the key operation section 18.

A recording section 19 comprises a high-capacity semiconductor memory or a compact hard disk which records the contents of a television broadcasting, and can record for maximum 5 to 6 minutes. The record of the contents of a broadcasting is not limited to record of image information, but includes record of audio information added to the image information.

The CPU 1 reads out audio and image information from the recording section 19, reproduces and outputs it. At this time, an audio is output from the embedded speaker 11 or the earphone 15. After a reproduction operation of recorded contents is started with the earphone 15 being connected, when the earphone connection detector 17 detects that the earphone 15 is disconnected during the reproduction operation, the CPU 1 pauses the reproduction operation (reproduction operation of recorded contents of audio and image). It is not limited to a case where the contents of a television broadcasting is recorded in the recording section 19, but may be recorded in the recording media 3. In this case, the CPU 1 reads out audio and image information from the recording media 3, reproduces and outputs it.

Next, the operational concept of the cellular phone device of the first embodiment will be explained with reference to flowcharts shown in FIGS. 2 and 3.

Individual functions described in those flowcharts are configurations of readable program codes, and stored in the memory section 2. Operations according to those program codes are consecutively executed. Operations according to those program codes transmitted via transmission medium can be consecutively executed. The same is true on the later-described other embodiments, and it is possible to execute operations particular to those embodiments by using programs/data externally supplied through recording media and transmission media.

Figure 2:
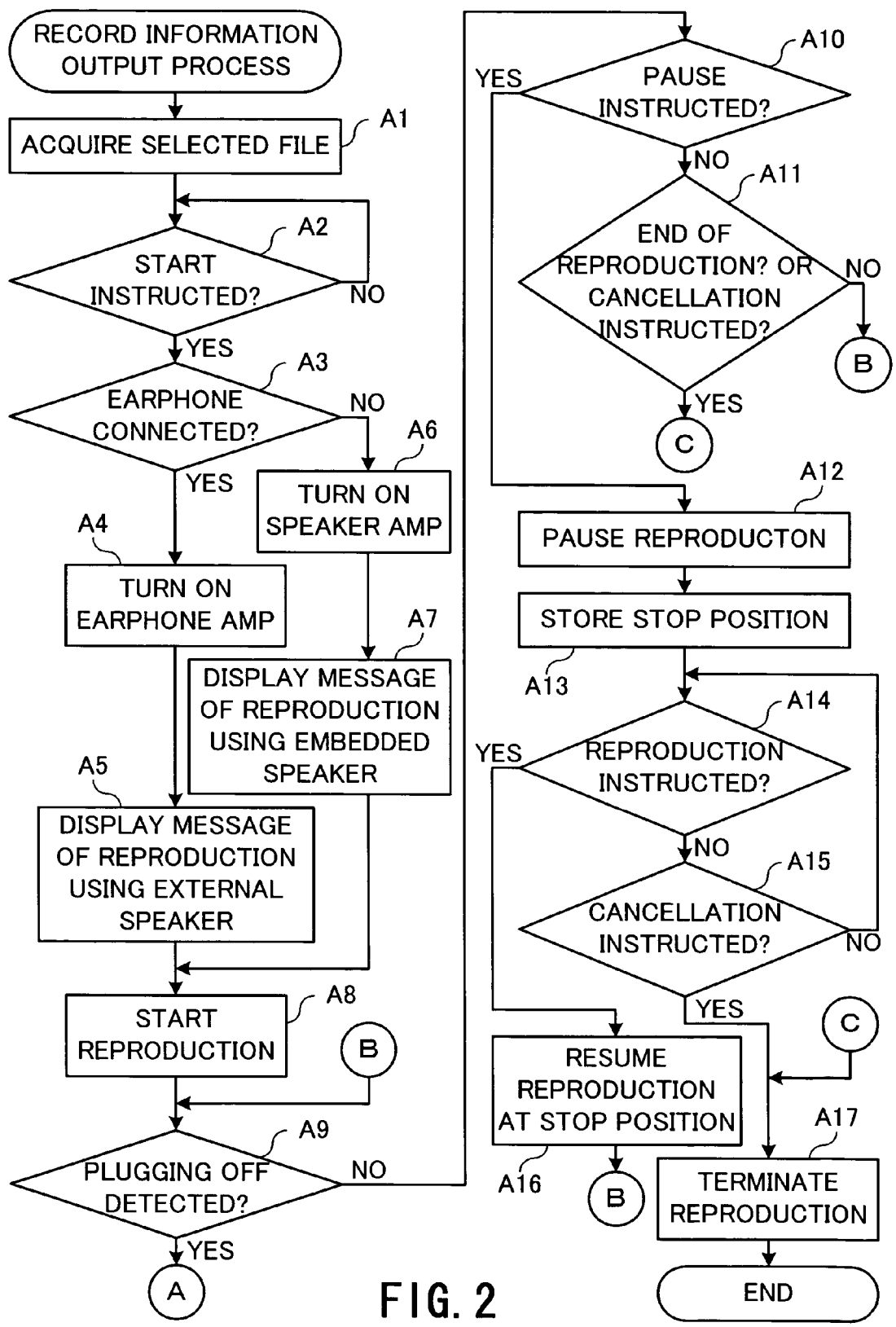
FIG. 2 is a flowchart illustrating a record information output process of the cellular phone device according to a first embodiment of the invention.
Figure 3:
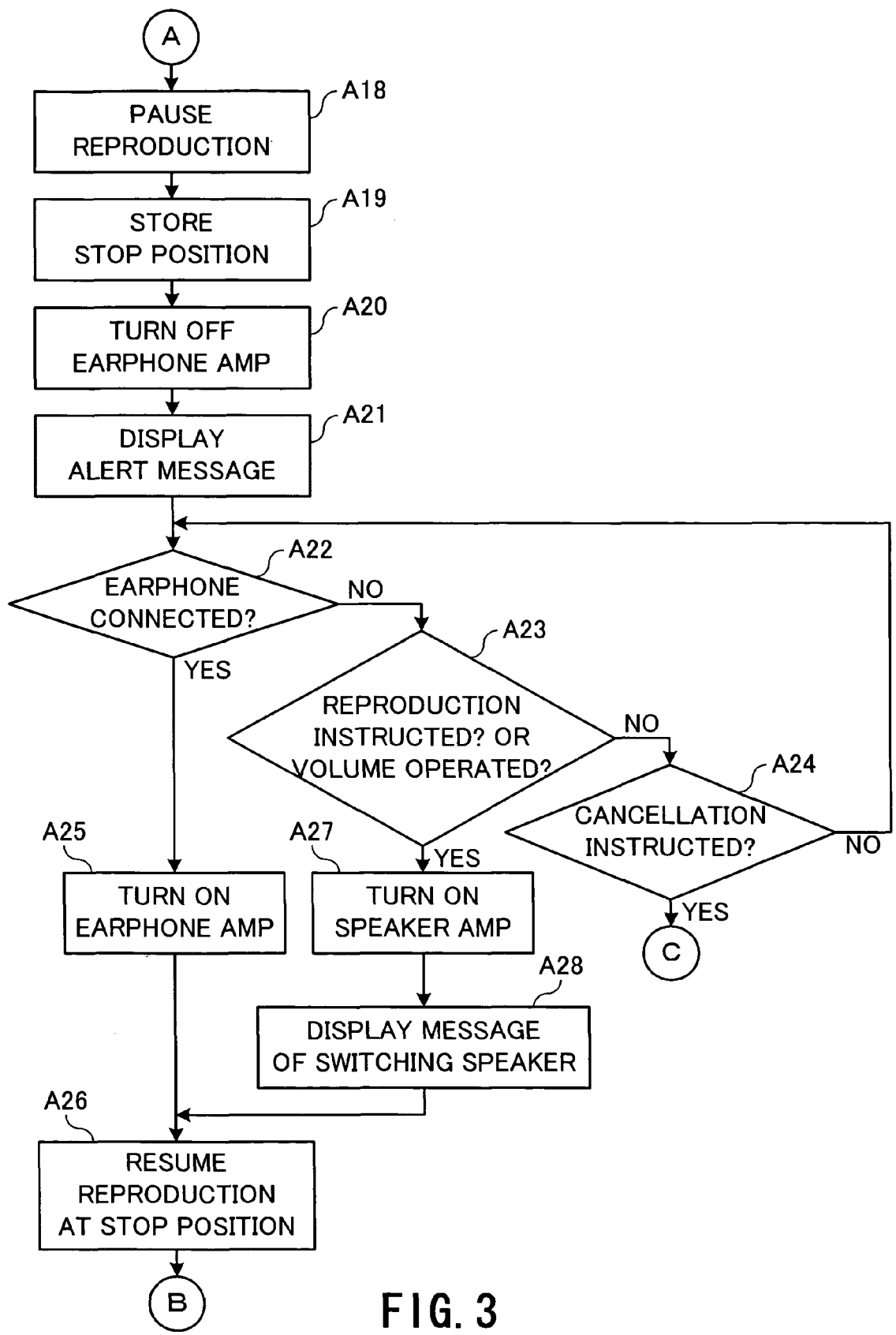
FIG. 3 is a flowchart illustrating the record information output process of the cellular phone device of the first embodiment of the invention.

FIGS. 2 and 3 are flowcharts illustrating a record information output process of the cellular phone device of the first embodiment of the invention.

Execution of the record information output process is started when the user specifies reproduction of recorded contents as record information.

First, the user selects an arbitrary record file among various record files stored and held in the recording section 19 every time a television broadcasting program was recorded, as a reproduction target. The CPU 1 acquires the selected reproduction target as a selected file (step A1).

Next, the CPU 1 determines whether start of reproduction is instructed or not (step A2). If start of reproduction is not instructed (NO at step A2), the CPU 1 waits for instruction of start of reproduction.

If start of reproduction is instructed (YES at step A2), the CPU 1 checks connection/disconnection of the earphone 15 based on a detection signal from the earphone connection detector 17 (step A3).

If the earphone 15 is connected (YES at step A3), the CPU 1 turns ON the earphone amplifier 14 (step A4), outputs an announcement message that an audio is reproduced by using the earphone 15 as an external speaker to the display device 8, and displays the message on the display device 8 (step A5).

If the earphone 15 is not connected (NO at step A3), the CPU 1 turns ON the speaker amplifier 10 (step A6), outputs an announcement message that an audio is reproduced by using the embedded speaker 11 to the display device 8, and displays the message on the display device 8 (step A7).

The CPU 1 turns ON the image output section 7 and the audio output section 9, consecutively reads out image information with audio information from the selected file selected as the reproduction target by the aforementioned scheme in the recording section 19, and starts reproduction and output of an audio and images (step A8).

Specifically, the CPU 1 gives the image output section 7 image information read out from the selected file, outputs it through the display device 8, and displays an image. The CPU 1 gives the audio output section 9 audio information read out from the selected file, outputs it through the embedded speaker 11 or the earphone 15, thereby generating a sound.

During this reproduction operation, the CPU 1 accesses the earphone connection detector 17 to check connection/disconnection of the earphone 15, thus checking whether the earphone 15 is plugged off or not (step A9).

If the earphone 15 is remained as it is connected (NO at step A9), the CPU 1 checks whether or not the user instructs pausing of the reproduction operation (step A10).

If pausing is not instructed (NO at step A10), the CPU 1 checks whether reproduction of all image information with audio information from the selected file is finished (end of reproduction) or not, or whether the user instructs cancellation of the reproduction or not (step A11). In a case where end of reproduction is not detected and the user does not instruct cancellation of reproduction (NO at step A11), the process returns to the step A9, and the CPU 1 continuously executes the reproduction operation.

In a case where pausing is instructed during the reproduction operation (YES at step A10), the CPU 1 pauses reproduction and output of an audio and images (step A12), and temporary stores that position (stop position) where reproduction of the selected file is paused (step A13). In this case, by pausing read out operation of audio information and image information, supply of information to the audio output section 9 and the image output section 7 is interrupted, and during this pausing, image information is fixedly displayed as it is. That is, an image screen at the time of pausing is directly displayed and output.

The CPU 1 determines presence/non-presence of a reproduction instruction from the user (step A14), and if there is no reproduction instruction (NO at step A14), determines presence/non-presence of a reproduction cancellation instruction from the user (step A15). If there is no reproduction cancellation instruction (NO at step A15), the process returns to the step A14. Accordingly, the CPU 1 becomes in a stand-by state until there is a reproduction instruction or a reproduction cancellation instruction.

When receiving a reproduction instruction (YES at step A14), the CPU 1 reads out the temporary stored data of stop position (pause position), resumes reproduction and output of an audio and images from that stop position (step A16), returns to the step A9, and continuously executes the reproduction operation.

When receiving a reproduction cancellation instruction (YES at step A15), the CPU 1 executes a reproduction termination process of terminating reproduction and output of an audio and images (step A17), and terminates the record information output process. Specifically, the CPU 1 turns OFF the earphone amplifier 14 or the speaker amplifier 10, and turns OFF the image output section 7 and the audio output section 9. In the step A11, in a case where end of reproduction is detected or the user instructs cancellation of reproduction (YES at step A11), the process also proceeds to the step A17, and the CPU 1 executes the reproduction termination process.

On the other hand, in a case where it is detected that the earphone 15 is plugged off during the aforementioned reproduction operation (YES at step A9), the CPU 1 pauses reproduction and output of an audio and images (step A18 in FIG. 3), and temporary stores that position where reproduction of the selected file is paused (step A19). In this case, image information is also fixedly displayed during the pausing. The CPU 1 turns OFF the earphone amplifier 14 (step A20), outputs an alert message which announces plug off of the earphone 15 to the display device 8, and displays this message on the display device 8 (step A21).

In this state, the CPU 1 checks connection/disconnection of the earphone 15 again, thus checking whether or not the earphone 15 is connected (step A22).

If the earphone 15 is still disconnected (NO at step A22), the CPU 1 checks whether the user instructs reproduction or not, or whether or not volume operation for adjusting a volume is performed (step A23). In a case where a reproduction instruction and volume operation is not performed (NO at step A23), the CPU 1 checks whether or not the user instructs reproduction cancellation (step A24). In a case where the cancellation of reproduction is not instructed (NO at step A24), the process returns to the step A22. Accordingly, if there is none of an instruction of reproduction/volume operation/an instruction of cancellation with the earphone 15 being plugged off, the CPU 1 becomes in a stand-by state.

In a case where the earphone 15 is connected (YES at step A22), the CPU 1 turns ON the earphone amplifier 14 (step A25), reads out the temporary stored stop position, reads out audio and image information at the stop position, and resume reproduction and output thereof (step A26). In this case, the audio information is generated and output from the earphone 15. The process returns to the step A9 in FIG. 2, and the CPU 1 continuously executes the reproduction operation.

In a case where a reproduction instruction or volume operation is performed with the earphone 15 being plugged off (YES at step A23), the CPU 1 turns ON the speaker amplifier 10 (step A27), and displays an announcement message which announces that reproduction is switched over to the embedded speaker 11 on the display device 8 (step A28). The process proceeds to the step A26, and the CPU 1 reads out the temporary stored stop position, and resumes reproduction and output of an audio and images at the stop position. In this case, audio information is generated and output from the embedded speaker 11. In a case where reproduction cancellation is instructed with the earphone 15 being plugged off (YES at step A24), the process proceeds to the step A17 in FIG. 2, and the reproduction termination process is executed.

As explained above, in the first embodiment, when the earphone connection detector 17 detects that the earphone 15 is disconnected during the reproduction operation of reproducing and outputting audio and image information in the recording section 19 with the earphone 15 being connected, the CPU 1 performs control in such a manner as to stop the reproduction operation.

Therefore, according to the first embodiment, even if the earphone 15 is disconnected during reproduction and output of recorded contents, it is possible to prevent output through the embedded speaker 11, and output audio and image information continuously after the disconnection. That is, even if the earphone 15 is plugged off during the reproduction operation, it is possible to prevent the user from bothering people nearby, and continuous reproduction without any affection from the plugging off of the earphone 15 is ensured.

In this case, when disconnection of the earphone 15 is detected during the reproduction process with the earphone 15 being connected, the CPU 1 displays and outputs an alert message that the earphone 15 is disconnected. Accordingly, involuntary plugging off of the earphone 15 can be informed.

When disconnection of the earphone 15 is detected during the reproduction operation of reproducing and outputting of audio and image information, the CPU 1 performs control in such a manner as to stop the reproduction operation for audio information and the reproduction operation for image information. Accordingly, it is possible to cope with watching and listening the recorded contents of a television broadcasting. In this case, the CPU 1 fixedly displays image information at the time of pausing while pausing reproduction of the image information. This permits the user to know that the earphone 15 is involuntary plugged off through the display state of images.

When reconnection of the earphone 15 is detected with the reproduction operation being paused, the CPU 1 continues the reproduction operation. Accordingly, by just reconnecting the earphone 15, the reproduction operation can be continued.

When reproduction instruction operation is carried out with the reproduction operation using the earphone 15 being stopped, the CPU 1 continues the reproduction operation using the embedded speaker 11. This enables quick switch over from the earphone 15 to the embedded speaker 11 in accordance with the instruction of the user.

In the foregoing first embodiment, when the earphone 15 is plugged off during the reproduction operation with the ear phone 15 being connected, the reproduction operation is paused. However, the reproduction operation may be stopped (terminated) with a reproduction position (stop position) at this time being stored and held. In this case, when start of reproduction is instructed again, presence/non-presence of setting of a reproduction position (stop position) is checked, and if the reproduction position is set, reproduction may start from that position.

In the foregoing first embodiment, the recorded contents of a television broadcasting program is reproduced and output. A reproduction target is, however, not limited to a television recording, and may be music information, audio information with images or the like externally supplied from the recording media 3. Speech contents of a communication may be recorded, reproduced, and output.

In the foregoing first embodiment, the earphone 15 has been taken as an example of an external output device, but a headphone, an external speaker or the like may be used as the external output device. The cellular phone device may be connectable with at least any one of the earphone, headphone, external speaker.

According to the first embodiment of the invention, when it is detected that the external output device is disconnected during the reproduction operation of reproducing and outputting recorded contents with the external output device being connected, the cellular phone device of the embodiment performs control in such a manner as to stop the reproduction operation. Accordingly, even if the external output device is disconnected while the recorded contents are reproduced and output, it is possible to prevent outputting through the embedded speaker, and output recorded contents continuously at the time of reproduction after that. That is, even if the external output device is disconnected during the reproduction operation, it is possible to prevent the user from bothering people nearby. Further, continuous reproduction without affection of the plugging off of the external output device becomes possible, thereby preventing generation of a portion missed.

"Disconnection of the external output device" means a state where the connection of the external output device is plugged off regardless of deliberation and fault. "Stop of the reproduction operation" means at least pausing of record reading out operation.

The cellular phone device of the embodiment has a connection section which is connectable with at least any one of an earphone, a headphone, an external speaker as a removable external output device. Accordingly, the user can connect the earphone, the headphone, or the external speaker according to needs, and listen to recorded contents.

When it is detected that the external output device is disconnected during the reproduction operation with the external output device being connected, the cellular phone device of the embodiment displays it in an alarming manner. Therefore, involuntary plugging off of the external output device can be informed.

When it is detected that the external output device is disconnected during the reproduction operation of reproducing and outputting sound information with image information, the cellular phone device of the embodiment performs control in such a manner as to stop the reproduction operation of the sound information and image information. Accordingly, it is possible to cope with, for example, watching and listening of recorded contents of a television broadcasting.

"Sound information" means the audio information or the like.

In this case, the controlling of stopping the reproduction operation is a pause control, and while reproduction of image information is paused, the cellular phone device of the embodiment fixedly displays image information at the time of pausing. Therefore, the user can come to know involuntary plugging off of the external output device through the display states of images.

The controlling of stopping the reproduction operation is a pause control, so that the cellular phone device of the embodiment continues the reproduction operation when it is detected that the external output device is reconnected with the reproduction operation being paused. Accordingly, it is possible to continue the reproduction operation by just reconnecting the external output device.

When reproduction instruction operation is carried out with the reproduction operation which uses the external output device being stopped, the cellular phone device of the embodiment continues the reproduction operation using an internal output device. Accordingly, it is possible to instantly perform switching over from the external output device to the internal output device in accordance with the instruction of the user.

"Internal output device" means the embedded speaker or the like.

Therefore, according to the embodiment, even if connection of the external output device is plugged off during reproduction and outputting of recorded contents, it is possible to continuously output the recorded contents at the time of reproduction after that.

Thus, in a case where the external output device is plugged off from the cellular phone device, it is possible to prevent the user from missing sound information without switching over sound output from external output to internal output.

Second Embodiment

The second embodiment of the invention will be explained below with reference to FIGS. 4 and 5.

In the first embodiment, when the earphone 15 is plugged off during the reproduction operation of reproducing and outputting audio and image information in the recording section 19, control is performed in such a way that the reproduction operation is stopped. In the second embodiment, in a case where the earphone 15 is plugged off when a television broadcasting is received and the broadcasting contents thereof is output, outputting of the broadcasting contents is suppressed (outputting is prohibited), and further, a television broadcasting received after that is consecutively recorded.

Structural components basically and nominally in common in both embodiments will be denoted by the same reference numbers, and explanations thereof will be omitted. The explanation will be mainly given of discriminative components of the second embodiment below.

Figure 4:
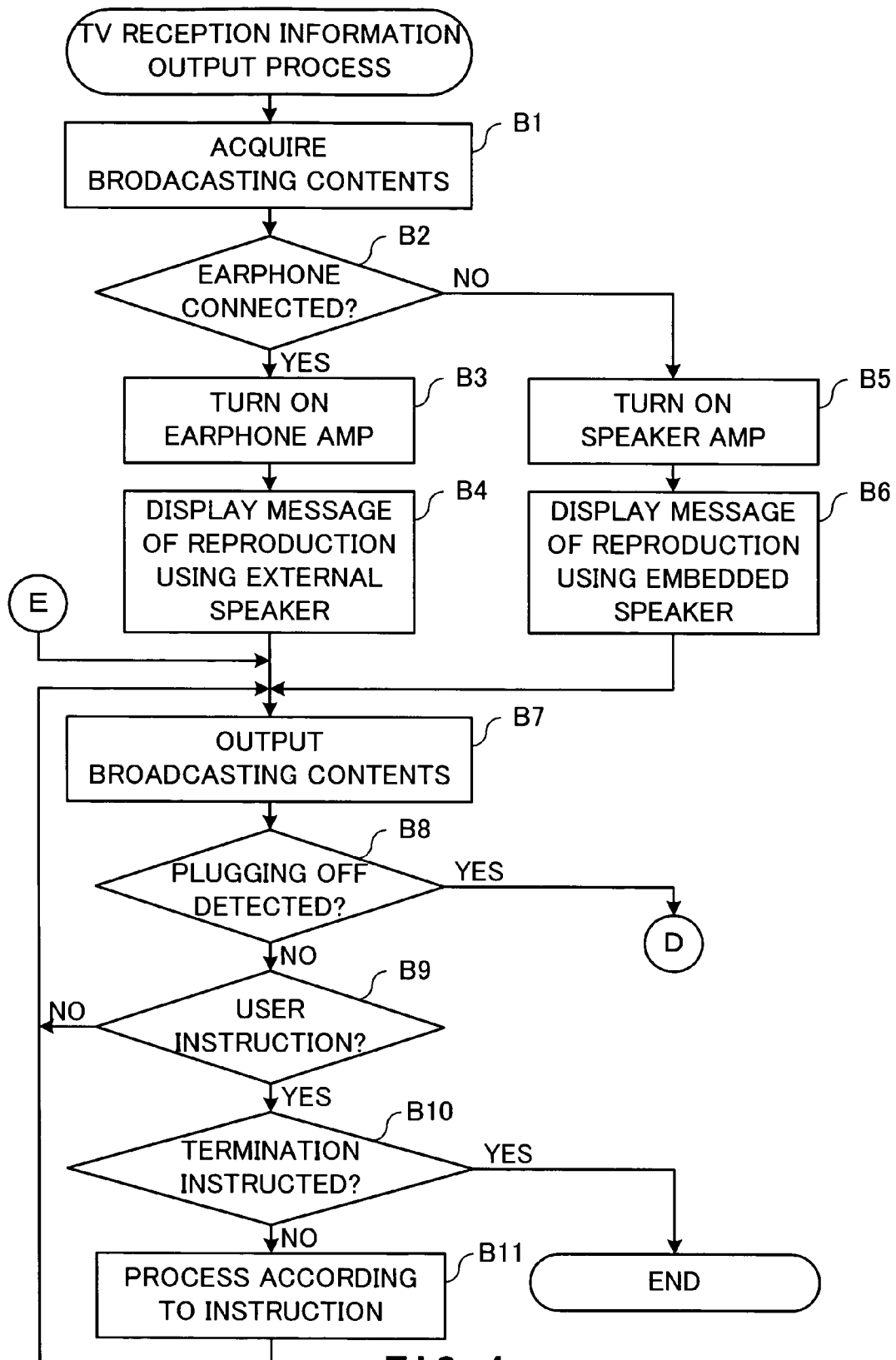
FIG. 4 is a flowchart illustrating a TV reception information output process of a cellular phone device according to a second embodiment of the invention.
Figure 5:
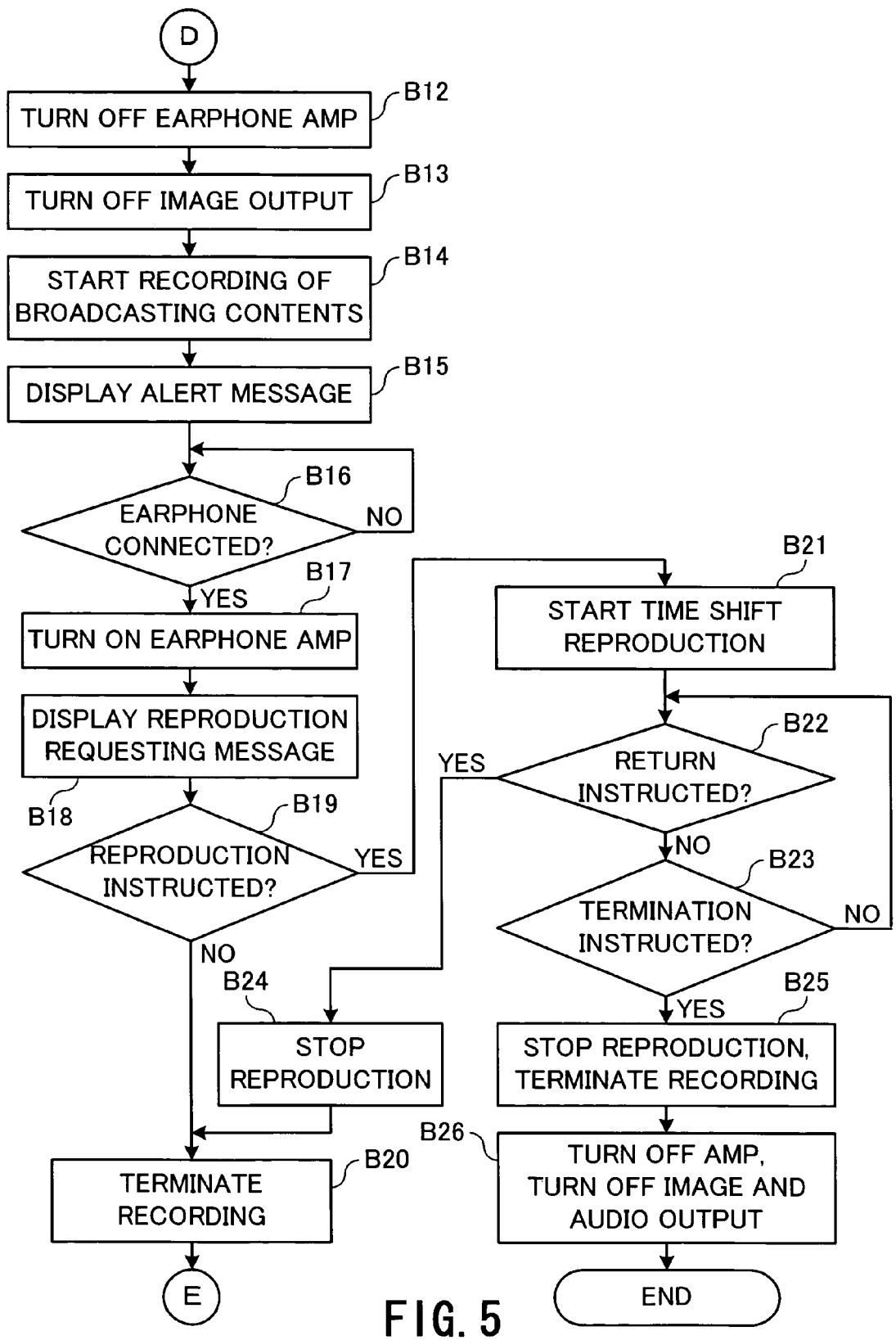
FIG. 5 is a flowchart illustrating the TV reception information output process of the cellular phone device of the second embodiment of the invention.

FIGS. 4 and 5 are flowcharts illustrating a TV reception information output process in a cellular phone device of the second embodiment of the invention.

Execution of the TV reception information output process is started together with starting up of a TV application. For example, when the user manipulates the mode key of the key operation section 18, selects and specifies "television reception mode", execution of the TV reception information outputting process is started.

First, as the user manipulates a channel selection button, selects and specifies a desired channel after the TV application is started up, the CPU 1 receives and acquires the broadcasting contents of the selected channel (step B1). The CPU 1 checks whether or not the earphone 15 is connected based on a detection signal from the earphone connection detector 17 (step B2).

If the earphone 15 is connected (YES at step B2), the CPU 1 turns ON the earphone amplifier 14 (step B3), outputs an announcement message that an audio is reproduced through the earphone 15 as an external speaker to the display device 8, and displays this message on the display device 8 (step B4).

If the earphone 15 is not connected (NO at step B2), the CPU 1 turns ON the speaker amplifier 10 (step B5), outputs an announcement message that an audio is reproduced using the embedded speaker 11 to the display device 8, and displays the message on the display device 8 (step B6).

The CPU 1 starts outputting the broadcasting contents (an audio and images) of the selected receiving channel (step B7).

Specifically, the CPU 1 turns ON the image output section 7 and the audio output section 9, gives image information to the image output section 7, output that information through the display device 8, thus displaying images. The CPU 1 gives audio information to the audio output section 9, outputs that information through the embedded speaker 11 or the earphone 15, thus generating sounds.

The CPU 1 accesses the earphone connection detector 17 during outputting of a television broadcasting, and checks whether the earphone 15 is connected or not, thereby checking whether the earphone 15 is plugged off or not (step B8).

If the earphone 15 is still connected (NO at step B8), the CPU 1 checks presence/non-presence of a user instruction (step B9), and if there is no user instruction (NO at step B9), the process returns to the step B7, and the CPU 1 continues outputting of an audio and images of the receiving channel. If there is a user instruction (YES at step B9), the CPU 1 determines whether the instruction is a termination instruction of the television reception output (step B10).

If it is instructed that the television reception output is to be terminated (YES at step B10), the CPU 1 terminates the TV reception information output process, and if receiving other instructions (NO at step B10), executes a process corresponding to the instruction, such as changing of a channel, or changing of a volume, in accordance with the contents of the instruction (step B11). Hereinafter, the process returns to the step B7 which outputs the audio and images of the receiving channel.

On the other hand, in a case where the earphone 15 is plugged off during outputting of a television broadcasting (YES at step B8), the CPU 1 turns OFF the earphone amplifier 14 (step B12 in FIG. 5), turns OFF image outputting (step B13), and starts audio recording and video recording the broadcasting contents of the receiving channel in the recording section 19 (step B14). The CPU 1 outputs an alert message, which announces that the earphone 15 is plugged off, to the display device 8, and displays that message on the display device 8 (step B15).

In this state, the CPU 1 accesses the earphone connection detector 17 and checks connection/disconnection of the earphone 15, thereby checking whether the earphone 15 is connected or not (step B16). In a case where connection of the earphone 15 is not detected (NO at step B16), the CPU 1 stands by until the earphone 15 is connected.

If the earphone 15 is connected (YES at step B16), the CPU 1 turns ON the earphone amplifier 14 (step B17), outputs a reproduction requesting message for inquiring whether or not the contents of the recording section 19 is reproduced and output to the display device 8, and displays that message on the display device 8 (step B18).

Next, the CPU 1 determines whether or not there is an instruction of reproducing recorded contents from the user (step B19). In a case where there is not reproduction instruction since the user desires to directly listen to and watch contents currently on air (NO at step B19), the CPU 1 terminates record operation (step B20). Hereinafter, the process returns to the step B7 which outputs the audio and images of the receiving channel.

In a case where receiving a reproduction instruction from the user (YES at step B19), the CPU 1 starts time shift reproduction while continuing record operation as it is (step B21). That is, reproduction and outputting of an audio and images of the recorded contents are started. Specifically, the CPU 1 executes feedback taking the recorded stop position when the earphone 15 is plugged off as stop position of reproduction, and starts the reproduction operation while reading out audio and image information at that stop position from the recording section 19.

The CPU 1 checks whether or not the user gives a return instruction for returning to contents currently on air during reproduction of the recorded contents (step B22), and if the return instruction is not given (NO at step B22), the CPU 1 checks whether an instruction of terminating reproduction is given or not (step B23). If the instruction of terminating reproduction is not given (NO at step B23), the process returns to the step B22. Accordingly, the CPU 1 becomes in a stand by state until a return instruction or reproduction termination instruction is given.

In a case where a return instruction is given (YES at step B22), the CPU 1 stop reproduction and outputting (step B24) and terminates record operation (step B20), and a process returns to the step B7 of outputting the audio and images of the receiving channel.

If a termination instruction is given (YES at step B23), the CPU 1 stops reproduction and outputting, and terminates record operation (step B25), turns OFF the earphone amplifier 14 or the speaker amplifier 10, and turns OFF the image output section 7 and the audio output section 9 (step B26), and terminates the TV reception information output process.

As explained above, in the second embodiment, when disconnection of the earphone 15 is detected during broadcasting output of outputting a television broadcasting received with the earphone 15 being connected, the CPU 1 pauses outputting of the television broadcasting, and consecutively records the television broadcasting received after that.

Therefore, according to the second embodiment, even if the earphone 15 is plugged off during outputting of a television broadcasting, it is possible to prevent the user from bothering people nearby, and a television broadcasting received after that can be reproduced and output in accordance with necessities. That is, even if the earphone 15 is plugged off while the user is listening and watching a television, continuous listening and watching becomes possible without affection of plugging off of the earphone 15.

In this case, when reconnection of the earphone 15 is detected during recording of a television broadcasting, the CPU 1 reproduces recorded contents and outputs those to the earphone 15. Therefore, it is possible to listen to and watch reproduction contents by just reconnecting the earphone 15.

When reconnection of the earphone 15 is detected during recording of the television broadcasting, the CPU 1 accepts selection operation of arbitrary selecting whether the recorded contents is reproduced and output through the earphone 15 or a current television broadcasting received after the reconnection is output through the earphone 15, and performs outputting in accordance with the selection operation. This results in selection of an output mode after the reconnection according to the user's demand.

In the foregoing second embodiment, the recorded stop position when the earphone 15 is plugged off is subject to feedback as a reproduction position, and the recorded contents of the television broadcasting are reproduced and output. However, it may be possible to start reproducing and outputting from just a little bit before when the earphone 15 is plugged off (for example, 3 seconds).

In the foregoing second embodiment, a case where a television broadcasting is listened and watched has been exemplified, but a listening and watching target may be a movie or a music downloaded and received from the Internet.

The external output device is not limited to the earphone 15, and may be a headphone, or an external speaker. The cellular phone device may be connectable with at least any one of the earphone, the headphone and the external speaker.

According to the above-described second embodiment of the invention, when it is detected that the external output device is disconnected during output of sound information received with the external output device being connected, the cellular phone device of the embodiment performs control in such a manner as to suppress outputting of the sound information, and consecutively records sound information received after that. Therefore, even if the external output device is plugged off during reception and outputting of sound information, it is possible to prevent the user from bothering people nearby, and further, it is possible to reproduce and output sound information received after that in accordance with necessities. For example, even if the external output device is plugged off during television listening and watching, continuous listening and watching without affection of plugging off becomes possible.

"Suppressing and controlling output of sound information" means preventing output through an internal output device to set a mute state and automatically adjusting a volume to a low level.

When reconnection of the external output device is detected during recording of sound information, the cellular phone device of the embodiment reproduces recorded contents and output it to the external output device. Therefore, it is possible to listen to reproduction contents by just reconnecting the external output device.

When reconnection of the external output device is detected during sequential recording of sound information, the cellular phone device of the embodiment accepts selection operation of arbitrary selecting whether recorded contents are reproduced and output to the external output device or sound information received after the reconnection is output to the external output device, and executes output in accordance with the selection operation. This makes it possible for the user to select an output mode after the reconnection according to the user's demand.

Sound information is sound information having image information, and is synchronized with the image information, and the cellular phone device of the embodiment consecutively records the image information together with the sound information. Therefore, it is possible to cope with, for example, listening and watching of a television broadcasting.

Therefore, according to the embodiment, even if the external output device is plugged off during reception and outputting of sound information, sound information received after that can be output according to necessities.

Because of this, in a case where the external output device is plugged off from the cellular phone device, it is possible to prevent the user from missing sound information without switching over sound output from external output to internal output.

The embodiments of the invention have been explained, modifications and applications according to various embodiments are possible for carrying out the invention, and the invention is not limited to the aforementioned embodiments.

For example, in the aforementioned embodiments, the invention is applied to the cellular phone device having a television function, but may be applied to other electrical wrist watches, a PDA (Personal Digital Assistant), an electrical camera device, a music reproducing machine, and the like.

For example, recording media (e.g., CD-ROM, flexible disk, RAM card, etc.) which respectively record program codes for allowing a compute to execute above-described means may be supplied.

Specifically, in the above-described embodiments, the explanation has been given of a case where operational programs are stored in a memory or the like beforehand in the cellular phone device. However, the cellular phone device that executes the above-described processes may be constituted by installing a program for executing the above-described operations into an existing cellular phone device from a distributed computer-readable recording medium, such as a flexible disk, a CD-ROM (Compact Disk Read-Only Memory), a DVD (Digital Versatile Disk), an MO (Magneto-Optical disk) or the like where the program is stored.

The program may be stored in a disk device or the like of a predetermined server device over a communication network like the Internet, superimposed on, for example, a carrier wave, and downloaded to a cellular phone device. The above-described processes can be executed by starting up and running the program while transferring the program over a communication network.

When an OS (Operating System) bears a part of the above-described functions and realized those function, or those functions are realized by cooperation of the OS and an application, portions other than the OS may be stored in a medium and distributed, and may be downloaded to a cellular phone device.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-176076 filed on Jun. 16, 2005 and including specification, claims, drawings and summary. The disclosure of the above Japanese Patent Application is incorporated herein by reference in its entirety.

What is claimed is:

1. A mobile terminal device which reproduces recorded content and outputs the recorded content to a removable external output device when the removable external output device is connected thereto, comprising:
   a detector for detecting whether the removable external output device is connected; and
   a reproduction controller which performs control such that a reproduction operation of the recorded content is stopped when the detector detects that the removable external output device is disconnected during the reproduction operation of reproducing and outputting the recorded content with the removable external output device being connected to the mobile terminal device.

2. The mobile terminal device according to claim 1, further comprising:
   a connection section which is connectable with at least one of an earphone, a head phone, and an external speaker as the removable external output device;
   wherein the detector detects whether the removable external output device is connected to the connection section.

3. The mobile terminal device according to claim 1, further comprising:
   an alert display section which displays an alert such that the removable external output device is disconnected, when it is detected that the removable external output device is disconnected during the reproduction operation with the removable external output device being connected.

4. The mobile terminal device according to claim 1, wherein when it is detected that the removable external output device is disconnected during the reproduction operation of reproducing and outputting sound information with image information, the reproduction controller performs control such that the reproduction operation of the sound information and a reproduction operation of the image information is stopped.

5. The mobile terminal device according to claim 4, wherein the control of stopping the reproduction operation is a pause control, and the reproduction controller fixedly displays image information at a time of pausing while pausing the reproduction of the image information.

6. The mobile terminal device according to claim 1, wherein control of stopping the reproduction operation is a pause control, and the reproduction controller continues the reproduction operation when the detector detects that the removable external output device is reconnected with the reproduction operation being paused.

7. The mobile terminal device according to claim 1, further comprising:
   an internal output section;
   wherein when a reproduction instruction operation is executed with the reproduction operation of outputting recorded content from the external output device being stopped, the reproduction controller continues the reproduction operation of outputting recorded content from the internal output section.

8. A non-transitory computer-readable recording medium encoded with a computer program executed by a mobile terminal that causes reproduction of recorded content which is output to a removable external output device when the removable external output device is connected to the mobile terminal, the computer program comprising:
   program code for performing a function of reproducing recorded content and outputting the recorded content to the removable external output device when the removable external output device is connected to the mobile terminal;
   program code for performing a function of detecting whether the removable external output device is connected to the mobile terminal; and
   program code for performing a function of performing control such that a reproduction operation of the recorded content is stopped when disconnection of the removable external output device is detected during the reproduction operation of reproducing and outputting the recorded content with the removable external output device being connected to the computer.

9. A computer program executing on a processor which, when used on a mobile terminal, causes the processor to reproduce recorded content which is output to a removable external output device when the removable external output device is connected to the mobile terminal, the computer program comprising:
   program code for performing a function of reproducing the recorded content and for outputting the recorded content to the removable external output device when the removable external output device is connected to the mobile terminal;
   program code for performing a function of detecting whether the external output device is connected to the mobile terminal; and
   program code for performing a function of performing control such that a reproduction operation of the recorded content is stopped when disconnection of the removable external output device is detected during the reproduction operation of reproducing and outputting the recorded content with the removable external output device being connected to the computer.

10. A mobile terminal device which outputs a sound based on sound data from a removably connected external output device, comprising:
    a sound output section which outputs the sound data to the removably connected external output device;
    a connection determination section which determines whether the removably connected external output device is connected;
    a sound output stop section which stops outputting of the sound data by the sound output section when the connection determination section determines that the removably connected external output device is not connected while the sound output section is outputting the sound data; and
    a sound output resuming section which resumes outputting of the sound data by the sound output section at that position where the sound output stop section has stopped outputting of the sound data, when the connection determination section determines that the removably connected external output device is connected while the sound output stop section is stopping outputting of the sound data.

11. The mobile terminal device according to claim 10, further comprising
    a memory section which stores the sound data;

wherein the sound output section outputs the sound data read out from the memory section to the removably connected external output device;

wherein the sound output stop section stops reading out of the sound data from the memory section when outputting of the sound data is to be stopped, and has a stop position recording section which records stop position of reading out; and wherein the sound output resuming section reads out the sound data from the stop position recorded by the stop position recording section, and resumes outputting of the sound data.

12. A non-transitory computer-readable recording medium encoded with a computer program executed by a mobile terminal that causes reproduction of recorded content which is output to a removably connected external output device when the removably connected external output device is connected to the mobile terminal, the computer program comprising:

program code for performing a sound output function of outputting sound data to the removably connected external output device;

program code for performing a connection determination function of determining whether the removably connected external output device is connected;

program code for performing a sound output stop function of stopping outputting of the sound data by the sound output function when it is determined that the removably connected external output device is not connected by the connection determination function during outputting of the sound data by the sound output function; and program code for performing a sound output resuming function of resuming outputting of the sound data by the sound output function at that position where outputting of the sound data has stopped by the sound output stop function, when it is determined that the removably connected external output device is connected by the connection determination function during the stopping of outputting of the sound data by the sound output stop function.

13. A computer program executing on a processor which, when used on a mobile terminal, causes the processor to reproduce recorded content which is output to a removably connected external output device when the removably connected external output device is connected to the mobile terminal, the computer program comprising:

program code for performing a sound output function of outputting sound data to the removably connected external output device;

program code for performing a connection determination function of determining whether the removably connected external output device is connected;

program code for performing a sound output stop function of stopping outputting of the sound data by the sound output function when it is determined that the removably connected external output device is not connected by the connection determination function during outputting of the sound data by the sound output function; and program code for performing a sound output resuming function of resuming outputting of the sound data by the sound output function at that position where outputting of the sound data has stopped by the sound output stop function, when it is determined that the removably connected external output device is connected by the connection determination function during the stopping of outputting of the sound data by the sound output stop function.

* * * * *